Feb. 23, 1971  I. A. LYND  3,564,732
SHEET WITH PEAR TREE INDICIA AND HOMONYMS
BEARING PEAR SHAPED CARDS
Filed June 29, 1966  2 Sheets-Sheet 2

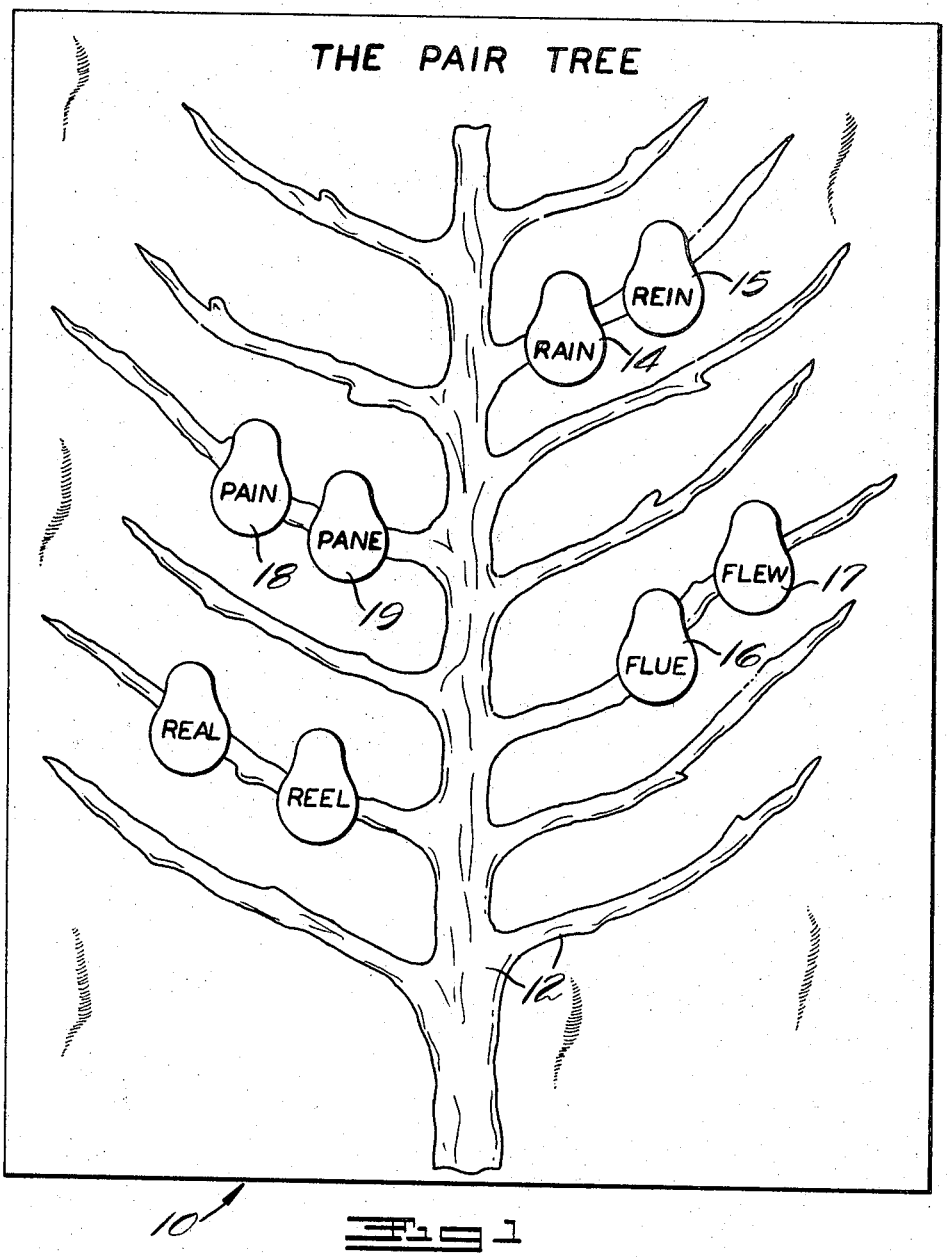

INVENTOR.
INEZ A. LYND
BY
*Cox & Sheridan*
ATTORNEYS

United States Patent Office 3,564,732
Patented Feb. 23, 1971

3,564,732
SHEET WITH PAIR TREE INDICIA AND HOMONYMS BEARING PEAR-SHAPED CARDS
Inez Adams Lynd, Ironton, Ohio, assignor to Wayne Lynd, trustee, Ironton, Ohio
Filed June 29, 1966, Ser. No. 561,485
Int. Cl. G09b 19/22
U.S. Cl. 35—35           1 Claim

ABSTRACT OF THE DISCLOSURE

There are disclosed several forms of apparatus for playing educational games, and methods for using such apparatus. The first apparatus consists of a cloth sheet having depicted thereon a representation of a tree designated as "The Pair Tree." Pairs of tags are provided, each tag of a pair having written thereon a word which when pronounced sounds like the word written on the other tag of the pair but is spelled differently. These are homonyms. The tags are shaped like pears.

The second apparatus consists of a plurality of playing cards having written thereon homonyms.

The third apparatus consists of a sheet formed of wood and of the shape of a large triangle to which are attached during the playing of the game pairs of smaller sheetlets, each pair having a pair of homonyms and each pair being of a like geometrical shape while all other pairs have different geometrical shapes.

BACKGROUND OF THE INVENTION

This invention deals with a game or games used as teaching devices. More specifically, the invention deals with means for the teaching of spelling, the meaning of words, and the meaning and spelling of homonyms.

One of the major obstacles encountered in the study of the English language is the occurrence of homonyms; that is, the occurrence of two words having the same sound but spelled differently. Teachers of young children, particularly "slow learners," and teachers of students who have first learned a language other than English find that the imparting of knowledge of homonyms can be one of their greatest challenges. Because of this, teachers include, in their never ending search for new teaching materials, a search for teaching material which will stimulate interest and develop understanding of the concept that quite different letter combinations may have the same pronunciation.

OBJECTS

It is therefore an object of this invention to provide instructional games which will stimulate the interest of pupils in word structure.

It is a further specific object to provide games which provide instruction concerning homonyms.

It is a further specific object to provide games which provide a pupil with assistance in the visualization of geometric shapes.

I have now found that the foregoing and related objects can be attained in several games including, for example, an instructional game comprising (1) a sheet provided with an indicium representing a tree, and (2) a plurality of sheetlets or tags, each tag or sheetlet having written thereon a word which is a homonym of a word printed on at least one other sheetlet, whereby pairs of said sheetlets containing homonyms can be secured to said sheet in juxtaposition relative to each other and relative to a portion of said indicium.

I have also found that the objects can be attained by other games including a game similar in purpose to the instructional game described in the last paragraph using geometric shapes for the indicium on the sheet and on the tags and including a card game in which each of the sheetlets or cards has a word printed thereon which is a homonym of a word printed on another sheetlet. There is in each game an element of chance as well as an element of skill and all such games have great appeal to all children as well as stimulating the interest especially of the slow learners.

Other objects and features of the invention will be apparent upon a reading of this specification and claim and upon a consideration of the accompanying drawings illustrating embodiments of my invention.

In the drawings:

FIG. 1 is a diagrammatic representation of a sheet designed according to my invention with paired sheetlets secured thereto;

FIG. 2 is a perspective view of a sheetlet of my invention;

With more specific reference to the drawings, it may be seen that I have illustrated in FIG. 1 a sheet, indicated generally by 10, which sheet may be made preferably of cloth, or of paper, wood, or any suitable thin sheet material providing a surface upon which an indicium 12 can be written. The indicium 12, as shown in FIG. 1, represents a tree, which may suggest a pear tree, but is indicated by the legend "The Pair Tree." Sheetlets which may be of cloth preferably, or of paper, card board, or any other relatively thin paper or of wood, metal, or plastic, are used. In this specific embodiment I have illustrated sheetlets 14, 15, 16, 17, 18, and 19. Sheetlet 14 is shown in detail in FIG. 2. The sheetlets illustrated as having a pear-shaped appearance may in certain games be secured to the sheet 10 in a manner such that homonyms are in juxtaposition relative to each other and relative to a portion of the tree 12.

I prefer that the sheet 10 and the sheetlets, such as 14, be made of cloth for durability and yet to permit of the sheet being folded for storage. Further, cloth pieces such as flannel, are relatively easy to secure to each other. For example, they will adhere to each other on pressure. If necessary, they can be pinned together repeatedly with little or no damage to the cloth. Many classrooms are equipped with a magnetized chalk board (or can obtain one with little difficulty). If so, the teacher can simply sketch a tree thereon and fasten the "word pears" thereto by attaching a metal paper clip or other metal object to each "pear."

As stated, I prefer to use cloth for the sheet and sheetlets. However, the sheet and sheetlets can be made of other materials and can be secured together in a number of ways. For example, the sheetlets can comprise a pressure sensitive adhesive surface which can be repeatedly pressed against and stripped from a wood sheet; paper sheetlets can be attached, by adhesive tape, to a paper sheet; wooden or paper tags can be attached by thumbtacks, to a wood sheet, and the like.

Figure 4:
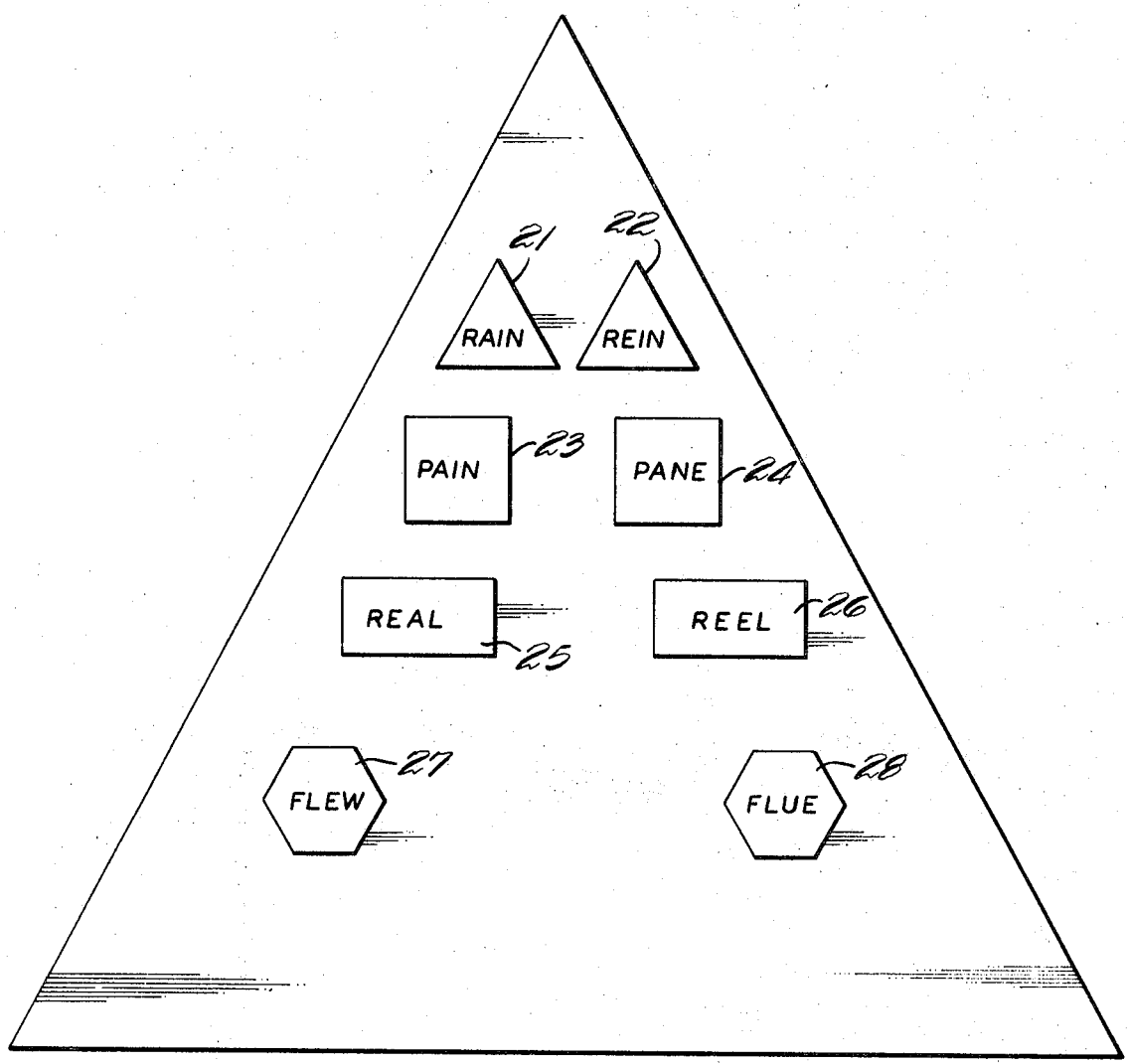
FIG. 4 is a diagrammatic view of a further embodiment of my invention.

In FIG. 4 I have shown a sheet in the form of an isosceles triangle. On this are hung pairs of geometric shapes of sheetlets, the pairs each being identified both by shape and by homonyms.

The Pair Tree is an instructional game, developed in a classroom, for the purpose of acquainting the class with a variety of commonly used homonyms. The materials necessary for the game may for example consist of a large flannel background on which is printed a large leafless tree and three packets of felt pear-shaped cutouts. Each packet contains nineteen pairs of homonyms, the homonyms increasing in difficulty from packet numbers one to three.

The game may be played in a number of ways, depending upon the needs of the class. The following games have proven successful:

(1) The teacher may hang a number of pairs on the tree at random. The children may be allowed to place the matching pears together on the limbs of the tree. Variation: The children may be invited to come to the board and pick a pair of pears (homonyms).

(2) The pears may be distributed, one to each child; the first child will hang his pear on the tree and the child who holds the homonym for it will hang his pear beside it.

(3) The teacher may hang one of each pair on the tree and ask the class to write the homonyms for them.

(4) One pupil can select a word-bearing sheetlet and secure it to a branch of the pear tree. A second pupil can then select a second sheetlet and, if it bears a homonym to the first word, hang it side by side with the first tag. If, however, the selected sheetlet does not bear a homonym to a word already on the tree, he would secure the sheetlet to some more remote spot on the tree. Thus, pupils can select successive sheetlets and pair them up whenever possible.

(5) The pears may be used as a means for securing partners for other games or contests; each child will be given a pear and he must find the one who matches it.

(6) The teacher may place all pears in a chalk tray in random order and conduct a relay race by rows allowing each child to run to the board, select a pear, hang it up, and race back to his seat. This is a very popular game.

I have used the Pair Tree game of the invention for example, with three different packets of tags, each packet graded according to the difficulty of the words and each containing nineteen pairs of homonyms.

| Word list for Pick-A-Pair card game |
| --- |
| Beet-beat.......... Heel-heal.......... Road-rode |
| Brews-bruise....... Hue-hew........... Neigh-nay |
| Capital-capitol.... Lie-lye............ Site-sight |
| Chews-choose..... Might-mite........ Stairs-stares |
| Clothes-close...... Mail-male......... Rain-rein-reign |
| Core-corps........ Our-hour.......... Due-dew |
| Flour-flower...... Pair-pear.......... Tier-tear |
| Four-fore......... Principle-principal.. Whole-hole |
|                   Rap-wrap........... |

In FIG. 4 I have shown a sheet having an isosceles triangle depicted thereon. On this triangle the students hang pairs of triangles such as 21 and 22, squares such as 23 and 24, rectangles such as 25 and 26, and hexagons such as 27 and 28.

All of the surfaces on which the smaller objects are hung are designated herein and in the claim as sheets, and all of the objects which are hung on the sheets are designated as sheetlets both herein and in the claim. This is true whether the sheets or sheetlets are of cloth, wood, paper, plastic, or metal. Furthermore, I have used the term sheetlets to designate the cards of a deck of playing cards as described in connection with FIG. 3.

It is to be understood that the above described embodiments of my invention are preferred embodiments thereof, but are disclosed herein for the purpose of illustration only, and various changes may be made therein without departing from the spirit and scope of the invention.

I claim:

1. An instructional game in which there is provided a sheet formed of cloth, on which there is depicted a tree having a plurality of limbs, in combination with a plurality of pairs of pear shaped tags, each pair of tags being formed of cloth, and being attached to

| Packet Number 1 | | | Packet Number 2 | | | Packet Number 3 | | |
| --- | --- | --- | --- | --- | --- | --- | --- | --- |
| Sea-see...... | Sum-some.... | Knew-new.... | Meet-meat.... | Bear-bare..... | Pain-pane.... | Weigh-way.... | Bell-bawl..... | Brews-bruise |
| One-won...... | Ate-eight..... | Fur-fir........ | Write-right.... | Sale-sail...... | Tax-tacks..... | Hair-hare..... | Doe-dough.... | Taught-taut |
| Two-to....... | Sew-so....... | Owe-oh....... | Rein-rain..... | Sox-socks..... | Daze-days.... | Sell-cell....... | Maize-maze... | Chews-choose |
| Pair-pear..... | Tail-tale...... | Die-dye....... | Their-there.... | Flew-flue..... | Flee-flea...... | Soul-sole...... | Board-bored... | Rays-raise |
| Sun-son...... | Fare-fair..... | Know-no..... | Made-maid.... | Ore-oar....... | Mail-male..... | Dear-deer..... | Veil-vale...... | Not-knot |
| Dew-do...... | By-bye....... | Here-hear.... | Pale-pail...... | Break-brake.. | Bread-bred... | Bow-bough... | Done-dun..... | Soar-sore |
|              | Would-wood.. |              | Real-reel..... |              |              |              | Ring-wring... |              |

Figure 3:
FIG. 3 is a perspective view of a sheetlet in the shape of a playing card.

I have also used a different embodiment of my invention which is illustrated in FIG. 3 and is described below.

Pick a Pair is a card game developed to acquaint the child with a variety of homonyms. It stimulates the interest of slow learners and, with the element of chance incorporated into a game of skill, it has great appeal for all children.

The deck consists of fifty-one sheetlets or cards and it contains twenty-four pairs of homonyms and one triple homonym. The purpose of the third card is to serve as a tie breaker, while adding extra excitement to the game.

To play the game, lay all sheetlets face down on the table. The first player turns up two sheetlets; if he shows a pair of homonyms he keeps them and turns up two more sheetlets. When he fails to turn up a pair, he passes to the next person. If a player turns up the third homonym to a pair he has already won, he may keep the sheetlet and take another turn. The player who takes the most sheetlets wins the game. The winner may begin first in the next game.

said sheet at a position depicting a single limb of said tree, and each tag of each pair of pear shaped tags so attached to each single limb having written thereon a word which is a homonym of the word written on the other tag of said pair of pear shaped tags.

References Cited

UNITED STATES PATENTS

| 778,110 | 12/1904 | Cannon | 35—35(9)X |
| --- | --- | --- | --- |
| 2,369,804 | 2/1945 | Schoolfield et al. | 35—35(8) |
| 2,554,408 | 5/1951 | Hile | 35—28UX |
| 3,104,106 | 9/1963 | Kenney et al. | 35—72X |
| 3,274,706 | 9/1966 | Friend | 46—D.A. |
| 3,316,669 | 5/1967 | Nachbar | 46—D.A. |

ANTON O. OECHSLE, Primary Examiner

U.S. Cl. X.R.

35—73; 273—152.1, 152.7